Figure 1:
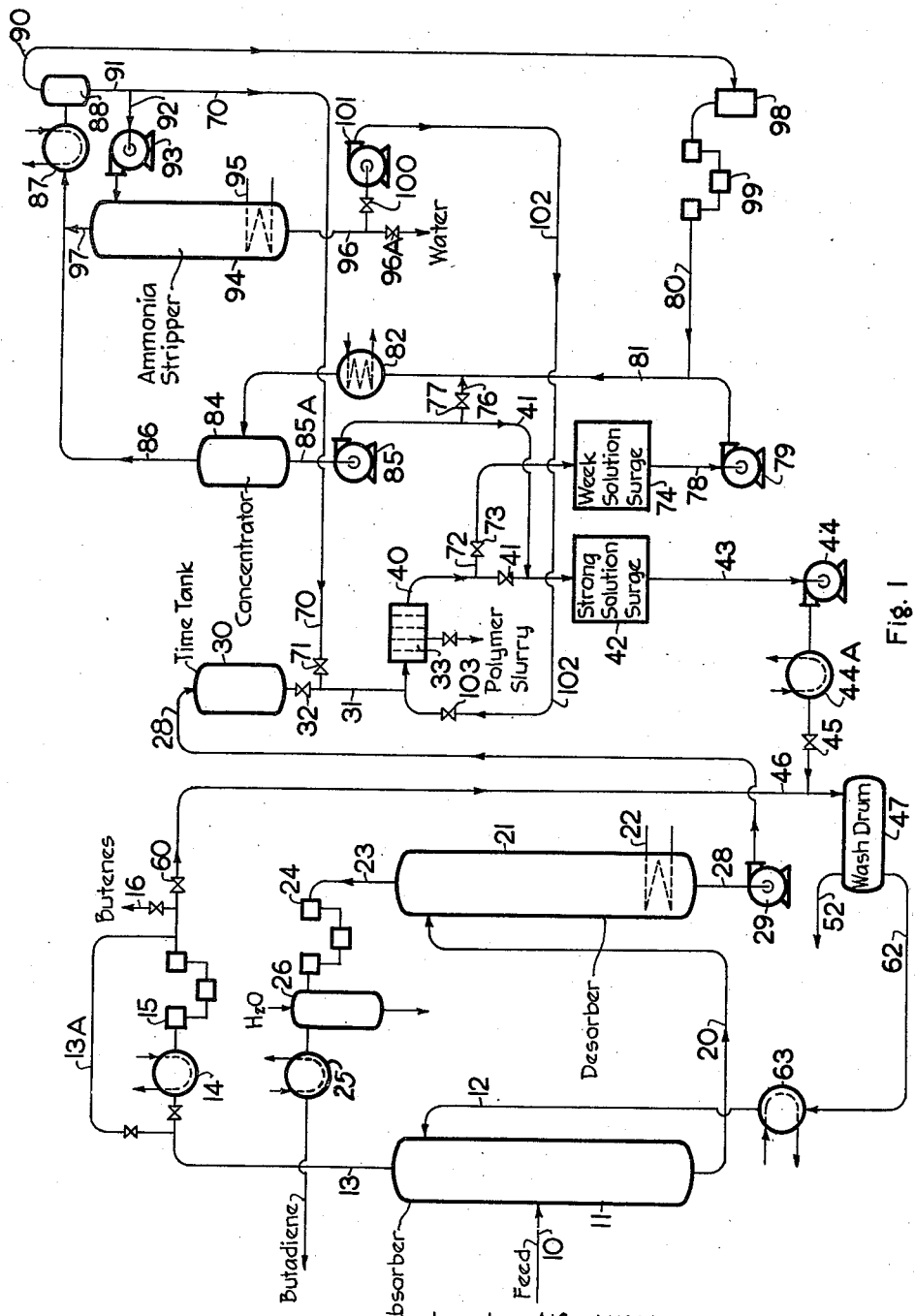

Inventor: Alfred W. Fleer
By his Attorney:

Patented Jan. 13, 1948

2,434,402

UNITED STATES PATENT OFFICE 2,434,402

METHOD OF CONCENTRATING DILUTE AQUEOUS SOLUTIONS OF METAL AMMONIUM COMPLEX COMPOUNDS

Alfred W. Fleer, San Francisco, Calif., assignor to Shell Development Company, San Francisco, Calif., a corporation of Delaware Application March 25, 1944, Serial No. 528,144

15 Claims. (Cl. 260—438)

The present invention relates to methods of concentrating dilute aqueous solutions of ammonium complexes of metal salts which form soluble complexes with ammonia and pertains more particularly to the concentration of dilute aqueous copper ammonium acetate solutions. This invention is also concerned especially with methods for recovering in optimum concentrations the copper ammonium acetate which is held up in the filtering facilities used in butadiene separation systems to remove solid impurities from the absorbing solution of copper ammonium acetate.

When it is attempted to remove by distillation the excess water from dilute aqueous solutions of many ammonium metal salt complexes (i. e. coordination compounds of metal salts with ammonia) it is found that the soluble ammonium complex decomposes with the evolution of ammonia gas and consequent deposition of metal, as such, or as an insoluble hydroxide oxide, etc. This problem of concentrating dilute aqueous solutions of ammonium complexes is also found to be part of the more specific problem of recovering copper ammonium acetate which is held up in the filters of acetylene-removal facilities in copper ammonium acetate absorption and purification systems used to separate butadiene from hydrocarbon mixtures.

It is therefore an object of this invention to provide an improved method of concentrating dilute aqueous solutions of soluble coordination compounds of metal salts and ammonia.

It is a special object of this invention to provide a method of reclaiming the residual copper ammonium acetate which is held up in the filters of systems for the removal of acetylenes from copper ammonium acetate solutions.

It is another object of this invention to provide an improved method of concentrating dilute aqueous copper ammonium acetate solutions.

The above and further objects of this invention will be readily apparent from the following description taken in relation to the drawing, which represents a simplified schematic flow diagram of the copper ammonium acetate absorption and purification facilities in relation to the facilities for reconcentrating the diluted aqueous copper ammonium acetate solution according to the present invention.

Briefly, the present method of concentrating a dilute aqueous solution of a soluble ammonium metal salt complex comprises removing water and $NH_3$ vapor from said dilute solution while adding extra ammonia having a $NH_3$ content greater than that of the removed vapor, the amount of $NH_3$ introduced being about equal to the amount of $NH_3$ removed with said vapor. Although the extra ammonia may be added intermittently, it is much more advantageous to add the ammonia continuously, in which case the ammonia is applied continuously at a rate, calculated on a $NH_3$ basis, about equal to the rate of $NH_3$ removal with the mixed water-$NH_3$ vapor.

While the method of the present invention is especially advantageous when applied to the concentration of dilute aqueous solutions of copper ammonium acetate, [$Cu(NH_3)_2OCOCH_3$], it will be described by way of illustration with regard to copper ammonium acetate solutions, dilute aqueous solutions of other ammonium metal salt complexes may be treated according to the broader aspects of the present invention. Thus, there are included other soluble ammonium metal salt complexes of relative instability (i. e., those which normally give off ammonia upon heating) and particularly the ammonium complexes of metal salts, the hydroxides of which metals are water-insoluble, and especially of those metal salts in which the anion is acetate. Such metals, whose salts form water-soluble ammonium complexes, include, for example, copper, zinc, cobalt, platinum, chromium, nickel, etc. Specific complex salts which decompose under normal heating of their aqueous solutions, include, for example, copper ammonium chloride [$Cu(NH_3)_2Cl$], cupric ammonium sulfate [$Cu(NH_3)_4SO_4$], zinc ammonium chloride [$Zn(NH_3)_4Cl_2$], zinc ammonium sulfate [$Zn(NH_3)_4SO_4$], cobaltic ammonium chloride [$Co(NH_3)_6Cl_3$], cobaltous ammonium chloride [$Co(NH_3)_6Cl_2$], platinous ammonium chloride [$Pt(NH_3)_2Cl_2$], silver ammonium chloride [$Ag(NH_3)_2Cl$], etc.

According to the present invention, a dilute aqueous solution of copper ammonium acetate is concentrated, preferably continuously, by heating the solution above 170 but below its normal boiling temperature and especially below 200° F. and removing mixed water-$NH_3$ vapor in a concentration and separation zone while adding supplemental ammonia, preferably as gas, at a rate about equal to the rate of $NH_3$ removal with said vapor. The additional ammonia is most desirably supplied in such manner as to enter the concentration zone below the liquid level therein. Thus, the additional ammonia is preferably continuously mixed with the dilute solution and this mixture is subsequently heated to remove said mixed water-$NH_3$ vapor. The mixture of dilute solution and additional ammonia may be first heated and then passed to the concentration zone, or the heating and water removal may both be carried out in the concentration zone. Although continuous concentration of said dilute solution is most desirable, the concentration of the dilute solution may be less advantageously carried out by intermittent addition of supplemental ammonia with cooling and the removal of mixed water-$NH_3$ vapor carried out with heating until the amount of ammonia, calculated as $NH_3$, taken off in the mixed water-$NH_3$ vapor, is about equal to the amount of $NH_3$ added. The additional ammonia is preferably anhydrous or nearly so, although any aqueous ammonia having a $NH_3$ content greater than that of the vapor removed in the concentration zone, and especially aqueous ammonia of at least 90% strength, may be used. Due to the addition of ammonia, a high partial pressure of $NH_3$ is maintained over the copper ammonium acetate solution at all times, whereby the $NH_3$ content of the concentrated solution withdrawn from the concentration zone is sufficiently high to prevent deposition of copper hydroxide or other insoluble copper compound. The amount of ammonia, calculated on a $NH_3$ basis, to be mixed with the dilute solution, depends upon the liquid-vapor equilibrium in the concentration zone, which equilibrium in turn depends upon the temperature, pressure, etc. in said zone and is preferably about equal to the amount of $NH_3$ withdrawn overhead from the concentration zone. Also, the amount of water vapor removed from the concentration zone is about equal to the sum of the water of dilution in the dilute solution and the water supplied with the additional ammonia.

The vaporized mixture of water and $NH_3$ leaving the concentration zone contains about 60–75%, and preferably about 70%, $NH_3$, depending upon the amount of water desired to be removed, the temperature and pressure, etc. Concentrated ammonia may be separated from this vaporous mixture, and recycled for addition as the supplemental ammonia.

Preferably, when the dilute solutions of copper ammonium acetate or the like contain a considerable amount of water, i. e., when the solutions are greatly diluted, it is generally preferred to recycle a portion of the reconcentrated solution for mixing with the dilute soultion before it enters the heating and concentration zone. This recirculation of concentrated solution becomes more important as the extent of water dilution is increased. For example, in order to insure that copper is not deposited, the concentration is carried out with a dilute solution mixture having a copper content of more than 0.5 and preferably greater than 1.0 mole per liter of solution. In this way, the required change in concentrations is lessened, although a greater volume is treated. The recirculation of the strong reconcentrated solution is advantageous also in that smoother operation is obtained.

A special feature of the present invention relates to the recovery of residual copper ammonium acetate in the filters of an acetylene-removal system used in connection with the separation of butadiene from hydrocarbon mixtures by means of aqueous copper ammonium acetate solutions. Briefly, this special combination comprises the method steps of filtering copper ammonium acetate solution containing filterable solids, preferably in an enclosed pressure filter, periodically discontinuing the filtration, displacement-washing the filter and filter cake with aqueous ammonia, and preferably following with a water wash for recovery of aqueous ammonia, collecting the aqueous wash liquid, and discharging the accumulated solids or filter cake from the filters as an aqueous slurry, and reconcentrating the diluted aqueous copper ammonium acetate solution, i. e., the collected aqueous wash liquid, by heating and removing mixed water-$NH_3$ vapor, preferably from a mixture of the diluted solution and concentrated solution, which mixture is obtained by recycling a part of the reconcentrated solution through the concentration zone, while adding supplemental ammonia having a $NH_3$ content greater than that of said mixed vapor.

By way of illustration, the invention will be described in relation to a copper ammonium acetate absorption and purification system for obtaining butadiene from mixtures of it with butenes, small amounts of acetylenes, etc., the absorption portion of the system being first described briefly for purposes of completeness and clearness.

Referring to the drawing, a hydrocarbon feed mixture containing butadiene, butenes and minor amounts of acetylenes, which mixtures may be either vapor or liquid is introduced through line 10 into the middle portion of an absorber 11 and passes countercurrently to downward flow of the absorbing solution of copper ammonium acetate, which is introduced cold near the top of absorber 11 through line 12. The aqueous copper ammonium acetate solution may suitably comprise 9.5–11.5 molar (i. e. grams mols/liter) $NH_3$, 3.0–3.3 molar total copper (including 0.2–0.4 mols cupric), and 3.5–4.5 molar acetate (calculated as acetic acid). Butenes and paraffins are not absorbed by the solution and pass out the top of the absorber 11 through line 13. This butene raffinate, if vaporous, is preferably cooled in cooler 14 and compressed to liquid form in compressor 15 and may be disposed of through line 16. If liquid, the raffinate may by-pass the compressor 15 through line 13A.

The butadiene and the small amount of acetylenes present are absorbed in the solution and pass out the bottom of the absorber 11 through line 20 into the upper portion of the desorber 21. In the desorber 21 the butadiene is desorbed at relatively low pressure by heating by means of a heating element 22 in the bottom portion of the desorber 21. The vaporized butadiene passes out the top of the desorber 21 through top line 23, compressor 24, water scrubber 26, which is necessary to remove ammonia from the product, and condenser 25, whereby a liquified butadiene product is obtained.

The lean solution which still contains the absorbed acetylene is withdrawn from the desorber 21 through line 28 by means of a pump 29 and passes to a time tank 30 or series of time tanks. The acetylene-bearing lean solution is retained at a relatively high temperature of about 160–200° F. preferably about 180° F., at a pressure of about 60–80 pounds gauge for about 50 to 100 and preferably about 70 minutes, depending upon the amount and nature of acetylenes present. Sufficient time is provided to polymerize the acetylenes to liquid and solid polymers.

The polymer-containing lean solution passes from the time tank 30 through line 31 and valve 32 to a filter 33, wherein the solid polymers and other solid impurities, including emulsifying agents of unknown compositions, are removed from the solution. A pressure filter of the enclosed type, such as a Sweetland filter, should be used. It is likewise highly desirable to introduce a filter-aid, such as a finely-divided mineral, into the lean solution stream ahead of the filter in order to improve the filtering efficiency.

The filtered solution then passes from the filter 33 through line 40, valve 41, strong solution surge tank 42, line 43, pump 44, cooler 44a, valve 45 and line 46 into wash drum 47, wherein the filtered solution is washed with an aliphatic, preferably unsaturated, hydrocarbon, especially the butene raffinate. This may be accomplished by introducing butene raffinate through line 46 and withdrawing butene raffinate containing dissolved liquid polymers through line 52. The washed solution passes out the bottom of the wash drum 47 through line 62 and then is recycled to the absorber through cooler 63 and line 12.

In the filtering operation, because of its semicontinuous nature, it is necessary to recover residual copper ammonium acetate from the filters before disposing of the accumulated solids or filter cake. This residual material is removed from the filter by washing with aqueous ammonia containing at least 5% by weight $NH_3$ and then preferably water washing the filters to remove residual ammonia. The wash liquid, which most economically includes both the ammonia wash and water wash, is collected, and the dilute solution of copper ammonium acetate, resulting therefrom is reconcentrated by removing the mixed water-$NH_3$ vapor while adding supplemental ammonia having a $NH_3$ content greater than that of said vapor. Inasmuch as this method of recovering of copper ammonium acetate from such filters and the reconcentrating of the diluted copper ammonium acetate solution includes the features constituting the improvements of the present invention, it will be described in more detail.

Referring to the right hand portion of the drawing, the filter 33 is displacement-washed after closing valves 32 and 41 by introducing aqueous ammonia of 5-50% by weight $NH_3$ through line 70, open valve 71 and line 31. About 2 to 10 and preferably 5 volumes (taken on the basis of the volume of the filter) of wash liquid has been found most suitable. Thereafter, the filter 33 is displacement-washed with about an equal amount of water from line 102 through valve 103 to recover the residual ammonia. The dilute solution, preferably combining both the displacement-wash liquids, issues from filter 33 through line 40 and passes through line 72 and opened valve 73 to the weak or dilute solution surge tank 74. The dilute solution at this point contains about 4-8 molar $NH_3$, 0.5-1.0 molar total copper and 0.5-1.0 molar acetate (calculated as acetic acid), when the wash liquid used is 30 w. per cent aqueous ammonia.

Dilute solution leaving the surge tank 74 through line 78 containing pump 79 and ammonia containing preferably not more than 10% water, and especially substantially anhydrous ammonia, from line 80 are mixed, and the mixture thereof passes into line 81. Thereafter, strong solution is preferably introduced into this mixture via line 76 and valve 77, which connects to strong solution line 85a after the pump 85. Sufficient strong solution may thus be added as a recycle stream to increase the copper content to about 2.0 to 2.5 molar, whereby smoother and more efficient operation in the subsequent concentration is obtained.

The resulting mixture enters the heater 82, wherein the temperature is raised to about 170° F. but not over 220° F. and preferably to 180-200° F. at about 15-30 p. s. i. The hot mixture passes into the concentrator 84, which is maintained at a pressure of about 10-20 p. s. i. and a temperature of about 170-210° F. It is essential that the ammonia be added before the solution is heated in heater 82 and at a rate, calculated as $NH_3$, about equal to the amount of vaporized $NH_3$ subsequently removed from the solution.

Reconcentrated solution of the original strong solution composition is withdrawn from the bottom of concentrator 84 and passed to the strong solution surge tank 42 by means of pump 85 and line 85A which connects to line 40 leading into surge tank 42.

Vapors of $NH_3$ and water are taken from concentrator 84 through top line 86 at about 180° F. They usually run about 70% $NH_3$ and 30% water and pass through condenser 87. The cooled fluid issuing from condenser 87 contains condensed water and passes to a separator 88, wherein gaseous ammonia of about 98% $NH_3$ content is taken overhead through line 90 and condensed water containing 25-35% $NH_3$ is withdrawn from the bottom of the separator 88 through line 91. A portion of this aqueous ammonia passes through line 91 to line 70 for use in washing the filter 33 as above described. The remainder is pumped by pump 93 through line 92 into ammonia stripper 94, where it is rectified. The temperature in the bottom of the stripper 94 is maintained by means of a heating element 95 or the like, according to the vapor pressure of water and $NH_3$, for example, at about 250° F. The pressure in the stripper 94 is maintained slightly lower than the pressure in the concentrator 84, e. g., from 8 to 18 p. s. i. Water containing less than about 1% $NH_3$ is discharged from the ammonia stripper 94 through bottom line 96 and may be disposed of through valve 96a. Preferably, however, this water passes through valve 100 and pump 101 in line 102 for use in the second wash of the filter 33. Aqueous ammonia vapor containing about 80% $NH_3$ leaving the top of the stripper 94 passes through line 97 into line 86 at a point ahead of cooler 87.

The ammonia vapor in line 90 passes to suction drum 98, thence by way of compressor 99 and lines 80 and 81 back to the concentrator 84.

As an example of a specific run, dilute aqueous copper ammonium acetate solution having a composition of 6 molar $NH_3$, 0.75 molar total copper, and 0.75 molar acetate (calculated or acetic acid) was concentrated to a solution having a composition of 10.5 molar $NH_3$, 3.2 molar total copper (including 0.3 molar cupric), and 4.0 molar acetate (as acetic acid) in the following manner: Weak or dilute solution from surge tank 74 was discharged from pump 79 through line 78 at a rate of 13,970 lbs./hr. This dilute solution in line 78 was combined with 18,530 lbs./hr. of recycle ammonia of 98% strength at 20 p. s. i. and 180° F. which was supplied through line 80. Into this resulting mixture in line 81 was introduced 23,500 lbs./hr. of recycle concentrated solution via line 76. Prior to passing through the heater 82, wherein the temperature at 20 p. s. i. was raised to about 209° F., the line 81 was flowing 18,530 lbs./hr. of gaseous ammonia and 37,470 lbs./hr. of solution. This mixture had a composition of about 10.5 molar $NH_3$, 2.5 molar total copper, and 3.0 molar acetate (calculated as acetic acid). The concentrator 84 was maintained at about 17 p. s. i. and 200° F. Vaporized aqueous ammonia of 72% NH₃ content was taken overhead from the concentrator 84 through line 86 at a rate of 29,000 lbs./hr., while reconcentrated aqueous copper ammonium acetate solution of the desired composition was withdrawn from the concentrator 84 through line 85a at a rate of 27,000 lbs./hr. Water withdrawn from the bottom of the ammonia stripper 94 through line 96 amounted to 5,582 lbs./hr.

I claim as my invention:

1. A method of concentrating a dilute aqueous solution of an ammonium metal salt complex without causing deposition of insoluble decomposition products, comprising heating said solution below its normal boiling temperature to remove mixed water-NH₃ vapor while adding prior to appreciable heating supplemental ammonia having a NH₃ content greater than that of said mixed vapor, the amount of introduced NH₃ being about equal to the amount of NH₃ removed with said vapor.

2. The method of claim 1, wherein said supplemental ammonia is continuously added at a rate, calculated on a NH₃ basis, about equal to the rate of NH₃ removed with said vapor.

3. The method of claim 2, wherein said supplemental ammonia contains at least 90% NH₃.

4. The method of claim 2, wherein said supplemental ammonia is substantially anhydrous.

5. A method of concentrating a dilute aqueous solution of copper ammonium acetate without causing deposition of insoluble decomposition products, comprising heating said solution below its normal boiling temperature to remove mixed water-NH₃ vapor while adding prior to appreciable heating supplemental ammonia having an NH₃ content greater than that in said mixed vapor, said ammonia being added at a rate, calculated on a NH₃ basis, about equal to the rate of NH₃ removal with said vapor.

6. A method of concentrating a dilute aqueous solution of copper ammonium acetate without causing deposition of insoluble decomposition products, comprising the steps of heating said solution below its normal boiling temperature, removing mixed water-NH₃ vapor from said heated solution in a concentration zone while maintaining a liquid phase in said zone, and simultaneously adding supplemental ammonia continuously prior to heating and causing said supplemental ammonia to enter the concentration zone below the liquid level therein, said supplemental ammonia having a substantially greater NH₃ content than the NH₃ content of said mixed water-ammonia vapor, said supplemental ammonia being added on a NH₃ basis at a rate about equal to the rate of removal of NH₃ with said mixed water-ammonia vapor.

7. The method of claim 6, wherein said supplemental ammonia is mixed with the dilute solution prior to the heating of said solution.

8. The method of claim 6, wherein concentrated ammonia of greater NH₃ content is separated from said removed vapor and said concentrated ammonia is supplied as the major portion of said supplemental ammonia.

9. The method of claim 6, wherein reconcentrated solution is continuously withdrawn from said concentration zone, and a portion of said reconcentrated solution is recycled with the dilute solution to said concentration zone.

10. The method of concentrating a dilute aqueous solution of copper ammonium acetate without causing deposition of insoluble decomposition products, comprising the steps of heating said solution below its normal boiling temperature, continuously removing mixed water-NH₃ vapor from said heated solution in a concentration zone, while maintaining a liquid phase in said zone, continuously withdrawing liquid reconcentrated solution from said zone at a rate proportional to the rate of introduction of dilute solution, recirculating a portion of said reconcentrated solution to said concentration zone with the dilute solution, simultaneously and continuously adding to said dilute solution prior to heating supplemental ammonia at a rate, calculated on a NH₃ basis, about equal to the rate of removal of NH₃ with the mixed water-NH₃ vapor, said supplemental ammonia having a substantially greater NH₃ content than that of said vapor, separating from said mixed water-NH₃ vapor concentrated ammonia having a NH₃ content equal to that of said supplemental ammonia, and passing said concentrated ammonia to said ammonia adding step.

11. A method of concentrating a dilute aqueous solution of copper ammonium acetate containing minor amounts of acetylene compounds without causing deposition of copper as insoluble hydroxide, acetylide, or the like, comprising the steps of heating said solution below its normal boiling temperature, removing mixed water-NH₃ vapor from said heated solution in a concentration zone while maintaining a liquid phase in said zone, and simultaneously adding supplemental ammonia continuously prior to heating and causing said supplemental ammonia to enter said concentration zone below the liquid level therein, said supplemental ammonia having a substantially greater NH₃ content than the NH₃ content of said mixed water-ammonia vapor, said supplemental ammonia being added on a NH₃ basis at a rate about equal to the rate of removal of NH₃ with said mixed water-ammonia vapor.

12. In a method for removing small amounts of acetylenes from an aqueous solution of copper ammonium acetate, wherein said acetylenes are polymerized, the polymer-bearing solution is passed through a filter to remove solid polymers, and the filtration is periodically discontinued to remove accumulated solids from the filter, the improvement comprising the steps of displacing residual copper ammonium acetate from the filter with aqueous ammonia of at least 5% by weight NH₃ content, thereby obtaining a dilute aqueous solution of copper ammonium acetate, and reconcentrating said dilute solution by heating said solution below its normal boiling temperature to remove mixed water-NH₃ vapor while adding to said solution supplemental ammonia having a NH₃ content greater than that of said removed vapor, the amount of added NH₃ being about equal to the amount of NH₃ removed with said mixed vapor.

13. The improved method of claim 12, wherein said displacement with aqueous ammonia is followed by displacement of the residual aqueous ammonia with water, and the displacing liquids are combined to form the dilute solution of copper ammonium acetate.

14. In a method for removing small amounts of acetylenes from an aqueous solution of copper ammonium acetate, wherein said acetylenes are polymerized, the polymer-bearing solution is passed through a filter to remove solid polymers, and the filtration is periodically discontinued to remove accumulated solids from the filter, the improvement comprising the steps of displacing residual copper ammonium acetate from the filter with an aqueous liquid having a NH₃ content of 5-35% by weight, thereby obtaining a dilute aqueous solution of copper ammonium acetate, heating said dilute solution to a temperature of 180°-200° F., removing mixed water-NH₃ vapor from said heated solution in a concentration zone while maintaining a liquid phase in said zone, continuously withdrawing liquid reconcentrated solution from said zone at a rate proportional to the rate of introduction of dilute solution, recirculating a portion of said reconcentrated solution to said concentration zone with the dilute solution, mixing supplemental ammonia with said dilute solution prior to heating at a rate about equal, calculated on a NH₃ basis, to the rate of removal of NH₃ with the mixed water-NH₃ vapor, said supplemental ammonia being substantially anhydrous, separating substantially anhydrous ammonia from said mixed water-ammonia vapor, and passing said substantially anhydrous ammonia to said ammonia-dilute solution mixing step.

15. The method of concentrating a dilute aqueous solution of copper ammonium acetate having a copper content of less than 0.5 mole per liter of solution and without causing deposition of insoluble decomposition products, comprising the steps of heating said solution below its normal boiling temperature, continuously removing mixed water-NH₃ vapor from said heated solution in a concentration zone, while maintaining a liquid phase in said zone, continuously withdrawing liquid reconcentrated solution from said zone at a rate proportional to the rate of introduction of dilute solution, recirculating a sufficient portion of said reconcentrated solution to said concentration zone with a dilute solution to obtain a mixture having a copper content in excess of 0.5 mole per liter, simultaneously and continuously adding to said dilute solution prior to heating supplemental ammonia at a rate, calculated on a NH₃ basis, about equal to the rate of removal of NH₃ with the mixed water-NH₃ vapor, said supplemental ammonia having a substantially greater NH₃ content than that of said vapor, separating from said mixed water-NH₃ vapor concentrated ammonia having a NH₃ content equal to that of said supplemental ammonia, and passing said concentrated ammonia to said ammonia adding step.

ALFRED W. FLEER.

REFERENCES CITED

The following references are of record in the file of this patent:

UNITED STATES PATENTS

| Number | Name | Date |
| --- | --- | --- |
| 2,188,899 | Hebbard | Feb. 6, 1940 |
| 2,288,547 | Pattock | June 30, 1942 |
| 2,318,988 | Craig | May 11, 1943 |

FOREIGN PATENTS

| Number | Country | Date |
| --- | --- | --- |
| 327,482 | Great Britain | Apr. 10, 1930 |

OTHER REFERENCES

Traite de Chimie Minerale Morssan (1906), vol. V, page 38.

Ephraim, "Berichte der Deutschen Chemischen Gesellshaft," vol. 52 (1919), page 954.